(12) United States Patent
Fujita et al.

(10) Patent No.: US 12,122,182 B2
(45) Date of Patent: Oct. 22, 2024

(54) HOT STAMPING APPARATUS

(71) Applicant: ILLUMINATION CORPORATION, Iwata (JP)

(72) Inventors: Yoshiharu Fujita, Iwata (JP); Koji Fujita, Iwata (JP)

(73) Assignee: ILLUMINATION CORPORATION, Iwata (JP)

( * ) Notice: Subject to any disclaimer, the term of this patent is extended or adjusted under 35 U.S.C. 154(b) by 169 days.

(21) Appl. No.: 17/520,306

(22) Filed: Nov. 5, 2021

(65) Prior Publication Data

US 2022/0169069 A1 Jun. 2, 2022

Related U.S. Application Data

(63) Continuation of application No. PCT/JP2021/027418, filed on Jul. 21, 2021.

(30) Foreign Application Priority Data

Nov. 30, 2020 (JP) .................. 2020-199240

(51) Int. Cl.
| | | |
|---|---|---|
| *B29C 51/10* | (2006.01) | |
| *B29C 51/12* | (2006.01) | |
| *B29C 51/18* | (2006.01) | |
| *B44C 1/17* | (2006.01) | |
| *B29L 31/00* | (2006.01) | |

(52) U.S. Cl.
CPC ............ *B44C 1/1729* (2013.01); *B29C 51/10* (2013.01); *B29C 51/12* (2013.01); *B29C 51/18* (2013.01); *B29L 2031/722* (2013.01)

(58) Field of Classification Search
CPC ......... B29C 51/10; B29C 51/12; B29C 51/18; B29C 59/02
See application file for complete search history.

(56) References Cited

U.S. PATENT DOCUMENTS

| | | |
|---|---|---|
| 2009/0295015 A1 | 12/2009 | Kuntz et al. |
| 2010/0143525 A1 | 6/2010 | Kuntz et al. |

(Continued)

FOREIGN PATENT DOCUMENTS

| | | |
|---|---|---|
| CN | 103189181 A | 7/2013 |
| DE | 19 84 297 U | 4/1968 |

(Continued)

OTHER PUBLICATIONS

English machine translation of JP2018-167511 as found on google patent. (Year: 2023).*

(Continued)

*Primary Examiner* — Edmund H Lee
(74) *Attorney, Agent, or Firm* — Oliff PLC

(57) ABSTRACT

A hot stamping apparatus and a hot stamping method are for collectively decorating a plurality of decoration objects using a decorative sheet. In a hot stamping apparatus, an upper chamber and a lower chamber are partitioned by a partition sheet and pressing bodies, so that decorative sheet pieces can be used instead of a decorative sheet having a large area. Then, by using the decorative sheet pieces, local thermal deformation can be prevented. A usage amount of the decorative sheet can be reduced, and three-dimensional decoration can be implemented as needed on a portion requiring decoration.

12 Claims, 8 Drawing Sheets

(56) References Cited

U.S. PATENT DOCUMENTS

2011/0064924 A1* 3/2011 Chang .................. B29C 35/08
                                                    264/496
2013/0220539 A1   8/2013 Takenouchi et al.

FOREIGN PATENT DOCUMENTS

| JP | S57-105310 A   |   | 6/1982  |
|----|----------------|---|---------|
| JP | H05-293896 A   |   | 11/1993 |
| JP | H08-011200 A   |   | 1/1996  |
| JP | H0811200       | * | 1/1996  |
| JP | 2012-096416 A  |   | 5/2012  |
| JP | 2014-128937 A  |   | 7/2014  |
| JP | 2018-167511    | * | 11/2018 |
| WO | 2012/058273 A1 |   | 5/2012  |
| WO | 2020/152931 A1 |   | 7/2020  |

OTHER PUBLICATIONS

Oct. 19, 2022 Search Report issued in EP Patent Application No. 21815091.0.
Aug. 17, 2021 International Search Report issued in Japanese Patent Application No. PCT/JP2021/027418.
Aug. 17, 2021 Written Opinion issued in Japanese Patent Application No. PCT/JP2021/027418.

* cited by examiner

HOT STAMPING APPARATUS

The present application relates to a hot stamping apparatus and a hot stamping method.

BACKGROUND

As a method of ornamenting (decorating) an interior/exterior of an automobile, a two-wheeled vehicle, or a ship or an interior/exterior of a household goods, spray coating or plating coating performed on a surface of a decoration object is known. In addition to a concern about a human body and the environment due to an organic solvent, the spray coating also takes time and effort in processes, such as requiring masking for a portion not to be coated. In a case of the plating coating, further coating is necessary in some cases in order to obtain a sufficient film thickness.

A radiator grille of a vehicle will be described as a further example. The radiator grille is usually provided on a front surface of the vehicle, and is a portion that is greatly related to a design of the vehicle. On the other hand, since the radiator grille faces a lower portion of the front surface of the vehicle, small stones and trees may come into contact with the radiator grille during traveling. Therefore, a decoration portion of the radiator grille is required to have high scratch resistance.

When plating is used for decoration of the radiator grille, painting or printing may be separately required depending on the design. In a case of partial plating, masking is required during painting. Further, in the case of the partial plating, a mold or a mounting tool which is a dedicated resin component for plating is required, and there is also a problem that a weight at the time of processing is increased.

In particular, when coating of a coating material is used for the decoration of the radiator grille required to have scratch resistance, it is necessary to perform coating a plurality of times in order to secure a required film thickness.

As one of methods for solving such a problem, a decoration method (vacuum pressure forming) using a film for decoration (decorative sheet) is known (JP-A-2012-096416). In addition, a decoration method for a decoration object having a special shape such as the radiator grille of the vehicle is also disclosed (JP-A-2015-020381).

When a plurality of decoration objects are collectively decorated by using a decorative sheet, there are several disadvantages in the method in the related art. For example, when a large-sized decorative sheet that covers an entire surface of a workbench is used, local thermal deformation occurs in a center portion of the decorative sheet, and thus the decoration may be different between the central portion and a peripheral portion. Specifically, there is a problem in that air accumulation and wrinkles occur due to the local thermal deformation.

Further, there is also a problem in that a certain amount of decorative sheet is required regardless of an area of the decoration object that requires decoration.

SUMMARY

In an embodiment, decorative sheet pieces that are cut in advance in accordance with a size of a decoration portion are used instead of a large-sized decorative sheet. A partition sheet for partitioning an upper chamber and a lower chamber is used.

A hot stamping apparatus includes a chamber which includes an upper chamber and a lower chamber; a placing table which is disposed inside the lower chamber and on which a decoration object is placed, a plurality of separate and independent decorative sheet pieces being fixed to the decoration object so as to be in direct contact therewith; a heater configured to heat the decorative sheet pieces; a partition sheet which is fixed to cover an opening portion of either the upper chamber or the lower chamber and is disposed above the decorative sheet pieces; and a vacuum pump configured to reduce a pressure in the chamber.

The hot stamping apparatus may include a pressurized tank configured to increase a pressure in the chamber.

In this case, adhesion between the decorative sheet piece and the decoration object can be improved.

A hot stamping method includes a step of placing a decoration object, to which a plurality of separate and independent decorative sheet pieces are fixed so as to be in direct contact therewith, in a chamber including an upper chamber and a lower chamber; a step of sealing the chamber in a manner of bringing the upper chamber and the lower chamber into tight contact with each other and partitioning a space in the upper chamber and a space in the lower chamber by a partition sheet, the partition sheet being disposed to cover an opening portion of the upper chamber or the lower chamber; and a step of reducing a pressure in the chamber in a state in which the decorative sheet pieces are heated, and bringing the decorative sheet pieces into tight contact with the decoration object.

The step of bringing the decorative sheet pieces into tight contact with the decoration object may further includes a step of increasing a pressure in the chamber from an upper chamber side.

In this case, adhesion between the decorative sheet piece and the decoration object can be improved.

The step of placing the decoration object to which the decorative sheet pieces are fixed may further include a step of placing a frame body around the decoration object.

In this case, since an appropriate pressure can be applied to the decorative sheet piece from directly above, displacement of the decorative position is prevented.

According to the hot stamping apparatus and the hot stamping method, since the decorative sheet pieces cut in advance are used instead of a large-sized (large-area) decorative sheet, the decorative sheet can be efficiently used. That is, three-dimensional decoration can be implemented as needed on a portion requiring decoration. In addition, since a thick decorative sheet can be used for decoration, the decorative sheet is also suitable for decoration of a decoration object which is required to have scratch resistance.

Further, since the decorative sheet piece is cut in accordance with a size of a decoration portion, the decorative sheet does not cause local thermal deformation, and has an effect that air accumulation and wrinkles are less likely to occur.

DETAILED DESCRIPTION OF EMBODIMENTS

Figure 1:
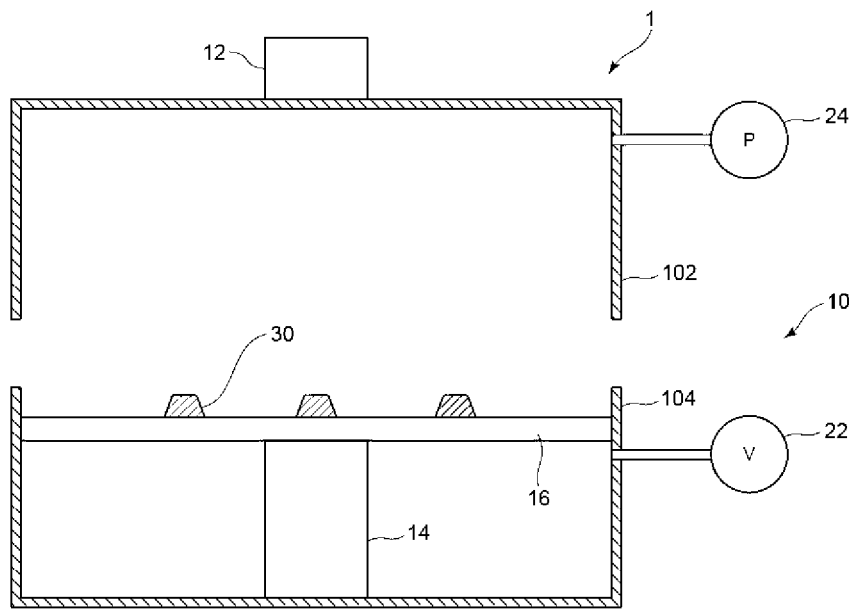
FIG. 1 is a diagram showing a step of placing a lower jig.

Next, embodiments will be described with reference to the drawings. In the following embodiments, the same or corresponding parts are denoted by the same reference numerals, and description thereof may be omitted as appropriate. The drawings used below are used to describe the present embodiment, and may be different from actual dimensions.

In a hot stamping apparatus 1 according to the present embodiment, an upper chamber 102 and a lower chamber 104 are partitioned by a partition sheet 18 and pressing bodies 38, so that decorative sheet pieces 36 can be used instead of a decorative sheet having a large area. By using the decorative sheet pieces 36, local thermal deformation can be prevented. Further, by using the decorative sheet pieces 36, a usage amount of the decorative sheet can be reduced, and three-dimensional decoration can be implemented as needed on a portion requiring decoration.

Hereinafter, the present embodiment will be described in detail with reference to the drawings.

First Embodiment

As shown in FIG. 1, the hot stamping apparatus 1 according to a first embodiment includes the upper chamber 102, a hanging portion 12, the lower chamber 104, a support portion 14, a placing table 16, a pressurized tank 24, and a vacuum pump 22. The hot stamping apparatus 1 further includes a heater 20 (not shown).

Hot stamping refers to a technique of pressing a heated foil (decorative sheet) against a decoration object and transferring the foil. The hot stamping is also referred to as foil stamping. Unlike coating, the hot stamping does not require direct coating (direct printing). In addition, the hot stamping has an advantage that a drying step is not required.

<Upper Chamber 102>

The upper chamber 102 and the lower chamber 104 in the following section constitute a chamber 10. The chamber 10 is a housing for processing a decoration object placed therein. The upper chamber 102 is hung by the hanging portion 12. The upper chamber 102 can be raised and lowered by a driving device (not shown). A sealed space can be formed in the chamber 10 by lowering the upper chamber 102 and bringing the upper chamber 102 into tight contact with the lower chamber 104.

<Lower Chamber 104>

The lower chamber 104 constitutes the chamber 10. The support portion 14 and the placing table 16 are provided in the lower chamber 104. In the present embodiment, the support portion 14 is fixed. However, a structure of the support portion 14 is not limited thereto, the support portion 14 may be raised or lowered by a driving device, and the placing table 16 may be moved due to the support portion 14.

<Placing Table 16>

The placing table 16 is a table provided in the lower chamber 104. The placing table 16 is supported by the support portion 14. Lower jigs 30, decoration objects 32, and frame bodies 34 are placed on the placing table 16. The placing table 16 has many small holes penetrating in a vertical direction. The vacuum pump 22 removes air above the placing table 16 through the small holes to reduce a pressure.

<Vacuum Pump 22>

The vacuum pump 22 is a pump for reducing a pressure in the chamber 10. The vacuum pump 22 removes air from a lower chamber 104 side. FIG. 1 shows a state in which the vacuum pump 22 is connected to the lower chamber 104 through a vent pipe. The vacuum pump 22 may be, for example, a commercially available gas delivery vacuum pump. The vacuum pump 22 according to the present embodiment can reduce the pressure in the chamber 10 to 0.06 MPa or less.

The vacuum pump 22 may be connected to the upper chamber 102 by a vent pipe, so that a pressure on an upper chamber 102 side can also be reduced. In this case, a pressure difference between the upper chamber 102 and the lower chamber 104 can be controlled.

<Pressurized Tank 24>

The pressurized tank 24 is a device for increasing the pressure in the chamber 10. In the present embodiment, the pressurized tank 24 increases the pressure from the upper chamber 102 side. FIG. 1 shows a state in which the pressurized tank 24 is connected to the chamber 10 through a vent pipe. By increasing the pressure from the upper chamber 102 side, a pressure is applied to the partition sheet 18 and the pressing bodies 38 so that the decorative sheet pieces 36 are brought into tight contact with the decoration objects 32. The pressurized tank 24 may be a commercially available pressurizing pump. The pressurized tank 24 according to the present embodiment increases the pressure in the chamber 10 to 0.1 MPa or more, preferably 0.5 MPa or more.

<Lower Jig 30>

The lower jig 30 is a jig for fixing the decoration object 32. As shown in FIG. 1, the lower jig 30 is placed on the placing table 16. A shape of the lower jig 30 can be appropriately changed in accordance with a shape of the decoration object 32.

<Decoration Object 32>

Figure 2:
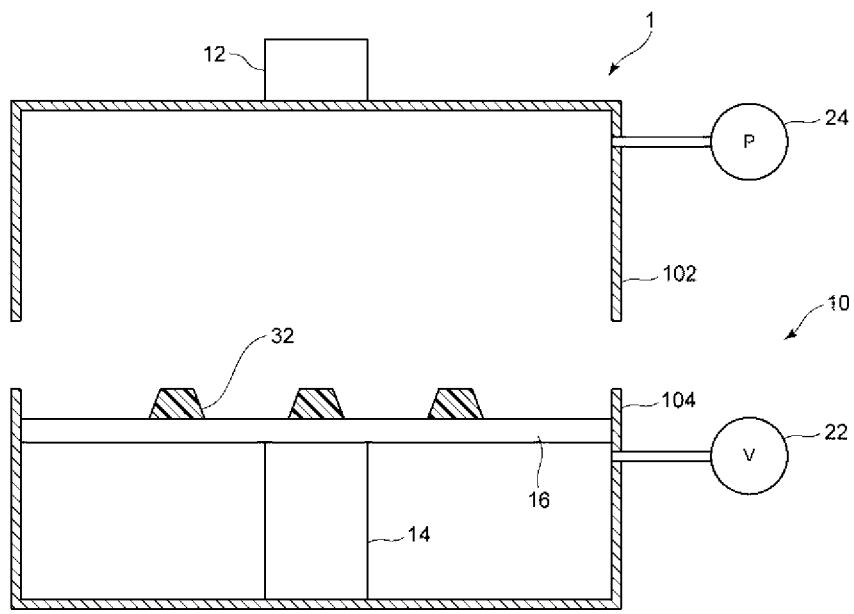
FIG. 2 is a diagram showing a step of fixing a decoration object.

The decoration object 32 is a member to be decorated. The decoration object 32 has a three-dimensional shape, and a part of or the whole of the decoration object 32 may have a convex shape or a concave shape. Examples of the decoration object 32 include a radiator grille of an automobile, an air outlet of an air conditioner, and a center panel. As shown in FIG. 2, the decoration object 32 is fixed to the lower jig 30.

<Frame Body 34>

Figure 3:
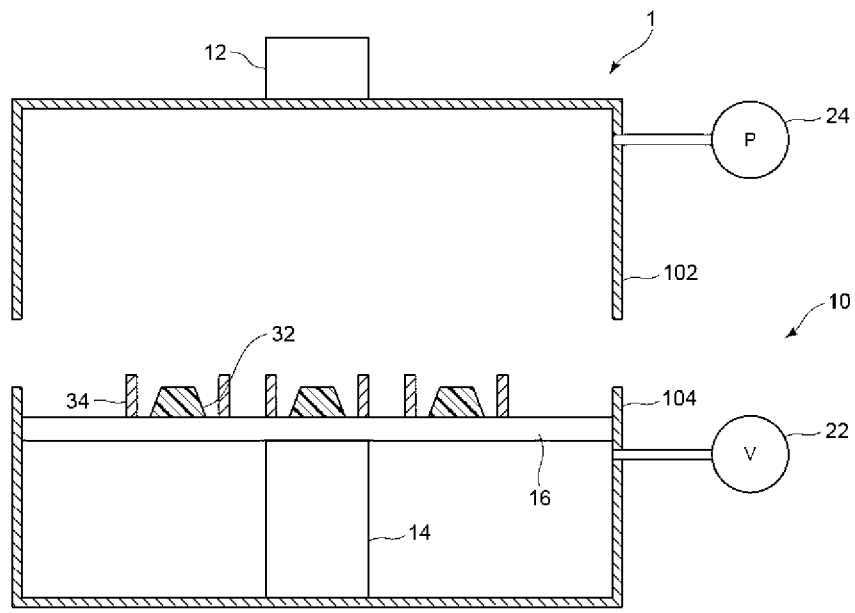
FIG. 3 is a diagram showing a step of placing a frame body.

The frame body 34 is a frame that is open in the vertical direction and has a rectangular shape in a top view. As shown in FIG. 3, the frame body 34 is placed on the placing table 16, and the frame body 34 is disposed so as to surround the decoration object 32. A height of the frame body 34 is designed to be higher than that of the decoration object 32 to which a decorative film is fixed.

The shape of the frame body 34 in a top view is not limited to a rectangular shape, and may be, for example, a circular shape or a polygonal shape other than a rectangular shape.

Disposing the frame body 34 around the decoration object 32 is advantageous in that the pressing body 38 can press the decorative sheet piece 36 from directly above, and uniform decoration can be performed. In addition, since a closed space surrounded by the pressing body 38, the frame body 34, and the placing table 16 is formed around the decoration object 32, a pressure around the decoration object 32 is efficiently reduced. Further, there is also an advantage that when a physical strength of the decoration object 32 is not high, the decoration object 32 is prevented from being applied to an excessive pressure, so that the decoration object 32 is protected.

<Heater 20>

The heater 20 is a heating device for heating the decorative sheet piece 36. For example, the heater 20 is disposed on an upper portion of the inside of the upper chamber 102, and heats the entire inside of the chamber 10. However, the heater 20 may be provided on other portions. For example, the heater 20 may be disposed in the lower chamber 104. As another example, the heater 20 may include a heating wire, and a periphery of the frame body 34 may be heated by winding the heating wire around the frame body 34. In this case, there is an advantage that the decorative sheet pieces 36 disposed inside the frame bodies 34 can be selectively and efficiently heated.

<Decorative Sheet Piece 36>

The decorative sheet piece 36 is a decorative sheet that is cut in advance in accordance with a size of a decoration portion of the decoration object 32. The decorative sheet piece 36 includes a surface portion having a design property. The decorative sheet piece 36 includes a plurality of layers. The decorative sheet piece 36 according to the present embodiment at least includes an adhesive layer, a decorative layer, and a protective layer. The adhesive layer is a layer that adheres to the decoration object under a heating condition. Examples of the adhesive layer include a thermoplastic adhesive and a pressure-sensitive adhesive. The decorative layer is a layer through which the design property is contributed to the decoration object after the decoration. On the decorative layer, for example, designs of wood grain tone, stone tone, and gloss tone are printed and vapor-deposited. The protective layer is a layer that protects a surface of the decorative sheet piece. With the protective layer, the decoration object can obtain scratch resistance and weather resistance.

Figure 4:
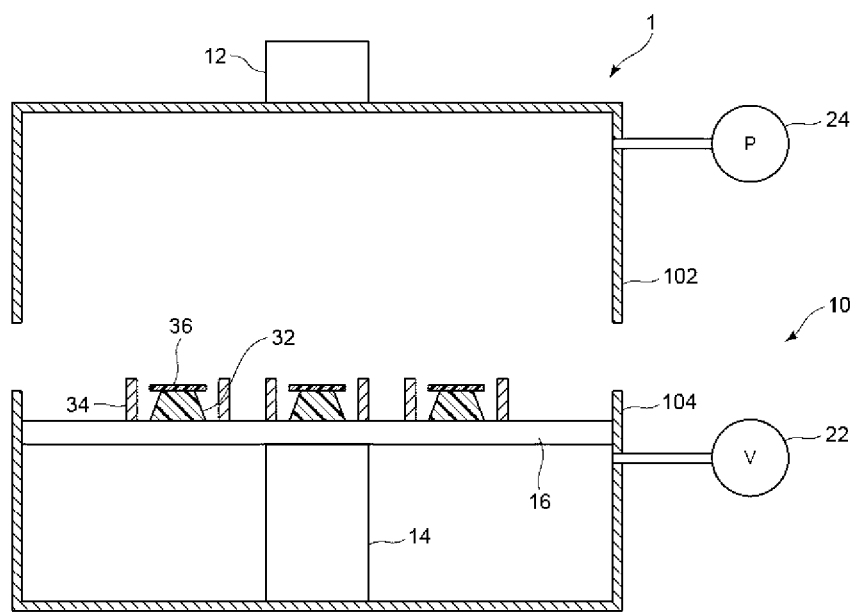
FIG. 4 is a diagram showing a step of fixing a decorative sheet piece.

As shown in FIG. 4, the decorative sheet pieces 36 are fixed onto the decoration objects 32. That is, at least one decorative sheet piece 36 is fixed to the decoration portion to be decorated. Any method may be used as a method of fixing the decorative sheet piece 36 onto the decoration object 32. For example, fixing with a fixing tool such as a clip or a pin, or fixing with an adhesive body such as an adhesive tape is used. When the frame body 34 is used, a size of the decorative sheet piece 36 is equal to or smaller than that of the frame body 34.

By using the decorative sheet pieces 36, the usage amount of the decorative sheet can be saved. This is because, for example, there is no need to use the decorative sheet piece 36 on a portion that does not require decoration, such as a portion between the decoration object 32 and the decoration object 32. In a case where two or more decoration portions are close to each other, when the two decoration portions are decorated with one decorative sheet, a displacement of the decoration may occur due to a stress applied to each of the decoration portions. In contrast, by using the separate and independent decorative sheet pieces 36 for the respective decoration portions, the decorative sheets do not interact with each other, and the displacement of the decoration can be prevented.

<Pressing Body 38>

The pressing body 38 is an elastic body for pressing the decorative sheet piece 36 against the decoration object 32. The pressing body 38 is disposed so as to cover an upper side of the frame body 34.

Figure 5:
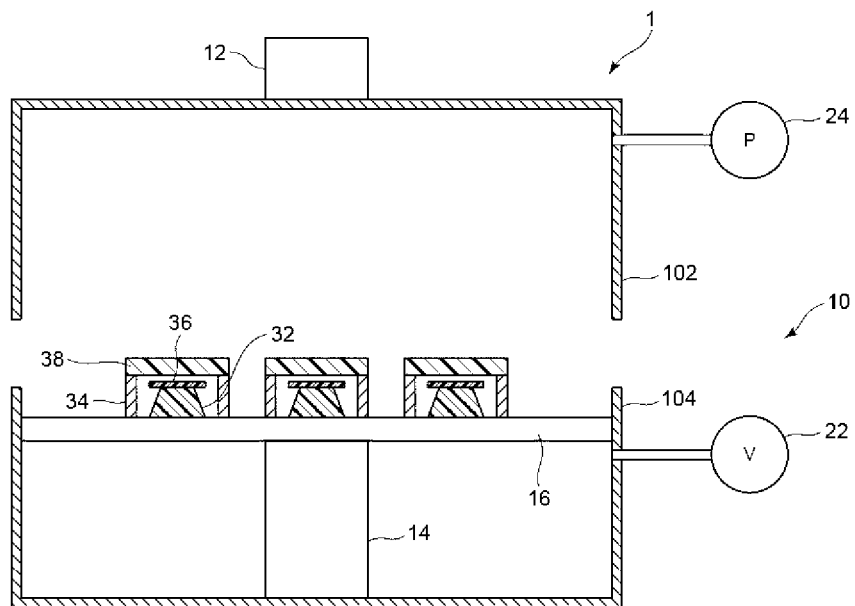
FIG. 5 is a diagram showing a step of arranging a pressing body.

FIG. 5 shows a state in which the pressing body 38 is bridged on the frame body 34. The lower jig 30, the decoration object 32, and the decorative sheet piece 36 on the decoration object 32 are provided in the space surrounded by the placing table 16, the frame body 34, and the pressing body 38.

In a step of changing the pressure in the chamber, the pressing body 38 physically presses the decorative sheet piece 36 to bring the decorative sheet piece 36 and the decoration object 32 into tight contact with each other.

For example, a resin such as acrylic (methacrylic) resin, polyacrylonitrile resin, polypropylene resin, polyethylene terephthalate resin, polystyrene resin, polycarbonate resin, or polyamide resin, a rubber such as styrene-butadiene rubber, chloroprene rubber, acrylonitrile rubber, ethylene-propylene rubber, silicon rubber, or urethane rubber, or a metal thin film such as an aluminum film is preferably used as a material constituting the pressing body 38. By using such a material, the pressing body 38 can be deformed in the step of changing the pressure in the chamber.

<Partition Sheet 18>

Figure 6:
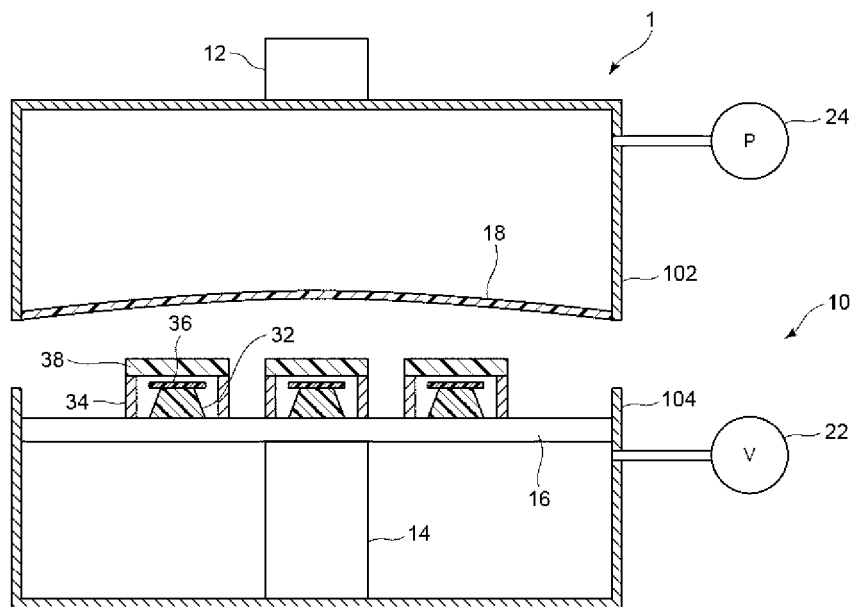
FIG. 6 is a diagram showing a step of arranging a partition sheet.

The partition sheet 18 is a sheet for partitioning the upper chamber 102 and the lower chamber 104. As shown in FIG. 6, the partition sheet 18 is disposed so as to cover an opening portion of the upper chamber 102. In the present embodiment, the partition sheet 18 is fixed to an end portion of the upper chamber 102.

The partition sheet 18 is made of a material that does not allow air to pass therethrough in order to maintain airtightness.

For example, a resin such as acrylic (methacrylic) resin, polyacrylonitrile resin, polypropylene resin, polyethylene terephthalate resin, polystyrene resin, polycarbonate resin, or polyamide resin or a rubber material such as styrene-butadiene rubber, chloroprene rubber, acrylonitrile rubber, ethylene-propylene rubber, silicon rubber, or urethane rubber is preferably used as the material constituting the partition sheet 18.

Figure 13:
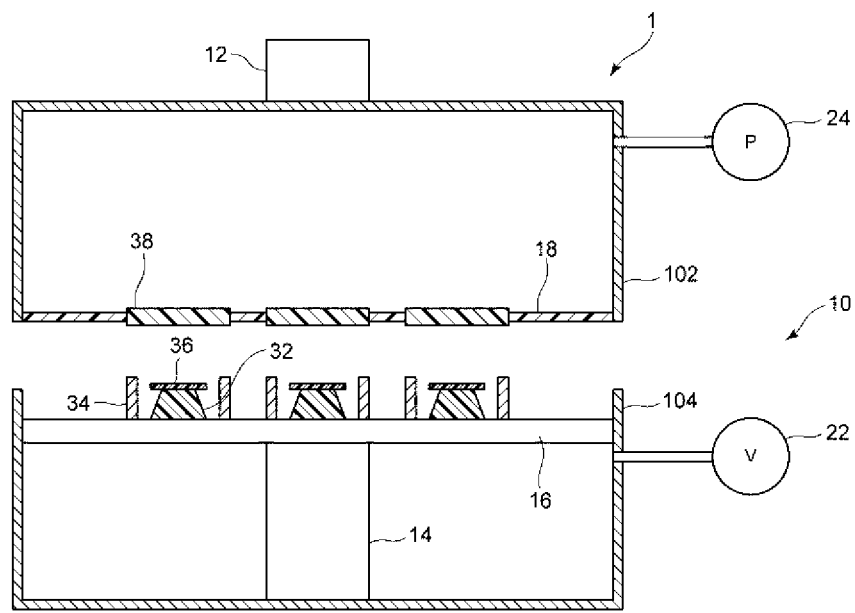
FIG. 13 is a diagram showing a state before a chamber is sealed.
Figure 14:
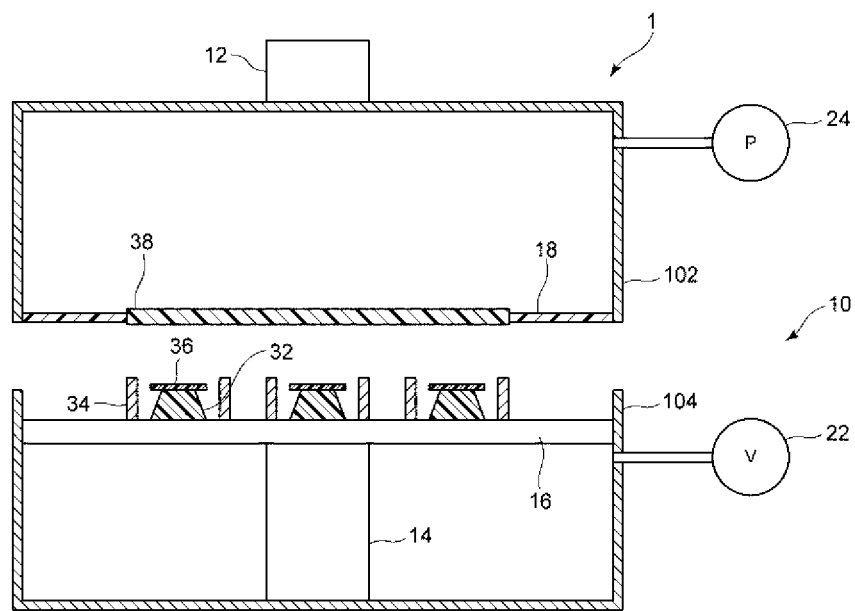
FIG. 14 is a diagram showing a state before a chamber is sealed.

As described in relation to FIGS. 13 and 14, the pressing bodies 38 and the partition sheet 18 may be integrated.

The partition sheet 18 maintains a pressure difference between the upper chamber 102 and the lower chamber 104 in the step of changing the pressure in the chamber 10. As compared with a case where the upper chamber 102 and the lower chamber 104 are partitioned by a decorative sheet, there is an advantage that the decorative sheet can be saved by separately using the partition sheet 18 having no decorative function.

<Vacuum Forming Method>

The hot stamping method according to the present embodiment is a vacuum forming method of performing hot stamping by bringing the decorative sheet pieces 36 respectively into tight contact with surfaces of the decoration objects 32 using the above-described hot stamping apparatus 1, and includes the following steps. Hereinafter, the steps will be described with reference to the drawings.

(1) A step of placing the decoration objects 32, to which the decorative sheet pieces 36 are respectively fixed, in the chamber 10 including the upper chamber 102 and the lower chamber 104.

(2) A step of bringing the upper chamber 102 into tight contact with the lower chamber 104 to seal the chamber 10.

(3) A step of reducing the pressure in the chamber 10 in a state where the decorative sheet pieces 36 are heated, and bringing the decorative sheet pieces 36 into tight contact with the decoration objects 32.

(4) A step of increasing the pressure in the chamber 10 from the upper chamber 102 side.

(5) Releasing the pressure-increasing/pressure-decreasing state, opening the chamber 10, and taking out the decoration objects 32 after processing.

(1) Placing the Decoration Objects 32, to Which the Decorative Sheet Pieces 36 are Respectively Fixed, in the Chamber 10 Including the Upper Chamber 102 and the Lower Chamber 104

FIG. 1 shows a state in which the lower jigs 30 are placed on the placing table 16 in the chamber 10. By using the lower jigs 30, the decoration objects 32, can be prevented from moving during the decoration, and the decoration portion can be prevented from being displaced. As shown in FIG. 1, a plurality of lower jigs 30 can be placed on the placing table 16.

In the present embodiment, a method of using the lower jig 30 will be described, but the lower jig 30 may not be used as long as the decoration object 32 does not move or the like during processing and is stable.

FIG. 2 shows a state in which the decoration objects 32 are respectively fixed to the lower jigs 30. Any method may be used as a method of fixing the lower jig 30 onto the decoration object 32. For example, a method of fitting and fixing the decoration object 32 and the lower jig 30 to each other may be used, or a method of fixing the decoration object 32 and the lower jig 30 by using a fixing tool such as a clip or a pin or an adhesive body such as an adhesive tape may be used.

FIG. 3 shows a state in which the frame bodies 34 are respectively placed around the fixed decoration objects 32. The frame body 34 is disposed so as to surround the decoration object 32. An example in which the frame body 34 is not used will be described later. One frame body 34 is used for one decoration object 32, but one frame body 34 may be used for a plurality of decoration objects 32. When one frame body 34 is used for one decoration object 32, a pressure from the pressing body 38 can be applied from directly above. As a result, a pressure from an unintended direction is prevented from being applied to the decorative sheet piece 36 and a decorative position is prevented from being displaced.

FIG. 4 shows a state in which the decorative sheet pieces 36 are respectively fixed onto the decoration objects 32. The decorative sheet piece 36 is fixed so as to be in contact with the decoration object 32. Any method may be used as a method of fixing the decorative sheet piece 36 onto the decoration object 32. For example, a method of fixing the decorative sheet piece 36 onto the decoration object 32 with a fixing tool such as a clip or a pin, or a method of fixing the decorative sheet piece 36 onto the decoration object 32 with an adhesive body such as an adhesive tape is used.

FIG. 5 shows a state in which the pressing bodies 38 are respectively disposed on upper sides of the decorative sheet pieces 36. In the present embodiment, the pressing bodies 38 are respectively bridged on the frame bodies 34. There is a gap between the decorative sheet piece 36 and the pressing body 38 in FIG. 5, but the pressing body 38 may be in contact with the decorative sheet piece 36.

FIG. 6 is a diagram showing a state in which the partition sheet 18 is fixed to the end portion of the upper chamber 102. As described above, the partition sheet 18 maintains the pressure difference between the upper chamber 102 and the lower chamber 104.

The partition sheet 18 may not be attached at this stage, and may be fixed to the upper chamber 102 in advance.

In the present embodiment, the decorative sheet piece 36 is fixed after the decoration object 32 is fixed to the lower jig 30, but the decorative sheet piece 36 may be fixed to the decoration object 32 and then fixed to the lower jig 30.

(2) Bringing the Upper Chamber 102 into Tight Contact with the Lower Chamber 104 to Seal the Chamber 10

Figure 7:
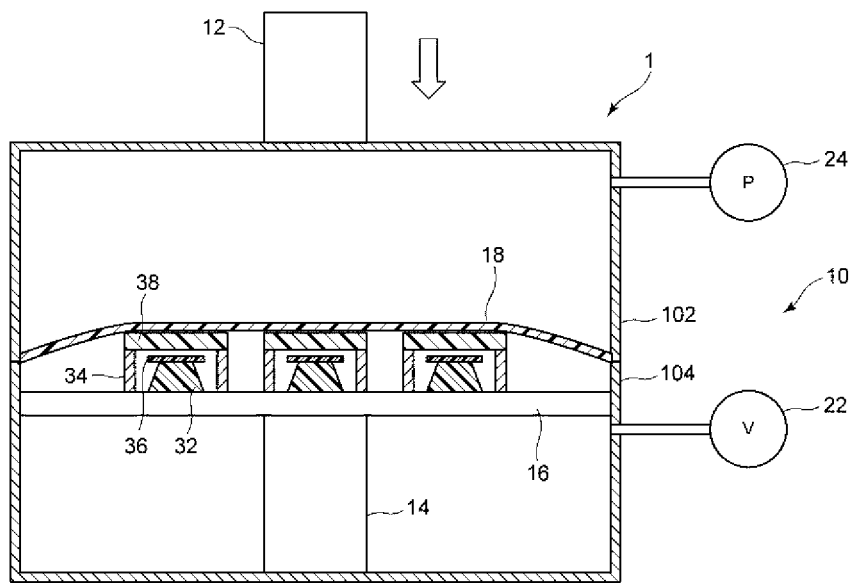
FIG. 7 is a diagram showing a step of sealing a chamber.

FIG. 7 shows a state in which the chamber 10 is sealed. A white arrow in FIG. 7 indicates that the upper chamber 102 is lowered. In the present embodiment, the upper chamber 102 is lowered and brought into tight contact with the lower chamber 104. At this time, an internal space formed by the upper chamber 102 and the lower chamber 104 is in a sealed state and has the airtightness. The partition sheet 18 partitions the upper chamber 102 and the lower chamber 104, and air movement does not occur between the upper chamber 102 and the lower chamber 104. In this state, it is preferable that the partition sheet 18 is in contact with the pressing bodies 38 and in a tension state. This is for fixing the pressing bodies 38.

(3) Reducing the Pressure in the Chamber 10 in a State Where the Decorative Sheet Pieces 36 are Heated, and Bringing the Decorative Sheet Pieces 36 into Tight Contact with the Decoration Objects 32

Figure 8:
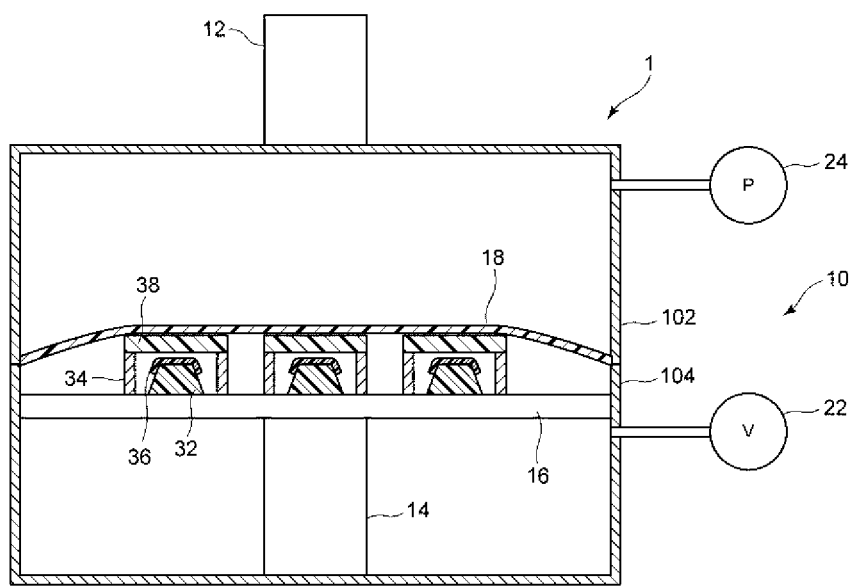
FIG. 8 is a diagram showing a step of heating the decorative sheet piece.

FIG. 8 shows a state in which the decorative sheet pieces 36 are heated. The inside of the chamber 10 is heated by the heater 20 (not shown). The decorative sheet piece 36 having thermoplasticity is softened by heating, and easily adheres to the decoration object 32. A temperature at which the decorative sheet piece 36 can be easily processed varies depending on the material, but a temperature inside the chamber 10 in this step is usually set to be from 90° C. to 200° C., particularly preferably from 100° C. to 140° C.

Figure 9:
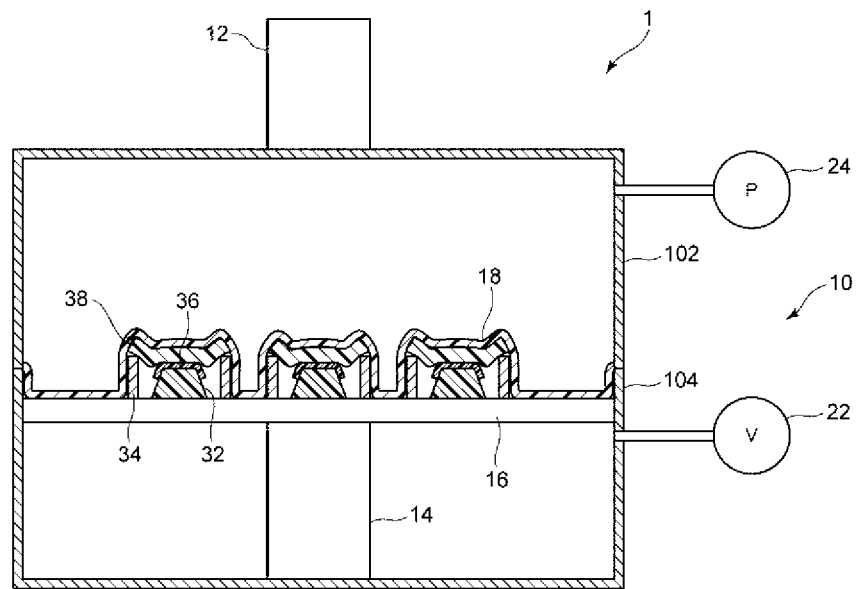
FIG. 9 is a diagram showing a step of reducing a pressure in the chamber.

FIG. 9 is a diagram showing a state in which the pressure in the chamber 10 is reduced. In this step, the vacuum pump 22 reduces the pressure in the lower chamber 104. Since the plurality of holes are formed in the placing table 16, a pressure of the space (hereinafter, referred to as a "decoration object peripheral space") around the decoration object 32 surrounded by the pressing body 38, the frame body 34, and the placing table 16 is reduced. In the present embodiment, the term "pressure is reduced" means that the pressure in the lower chamber 104 is reduced to 0.06 MPa or less.

Since the air escapes from a space between the decoration object 32 and the decorative sheet piece 36 due to the pressure being reduced, the decoration object 32 and the decorative sheet piece 36 come into tight contact with each other.

In addition, the pressure of the decoration object peripheral space is reduced, so that the elastic pressing body 38 is deformed such that a volume of the decoration object peripheral space is reduced. As a result, since the pressing body 38 presses the decorative sheet piece 36, the decoration object 32 and the decorative sheet piece 36 further come into tight contact with each other.

In the present embodiment, the pressure in the chamber 10 is reduced after the decorative sheet piece 36 is heated, but the heating of the decorative sheet piece 36 and the reducing of the pressure in the chamber 10 may be performed at the same time, or the decorative sheet piece 36 may be heated after the pressure in the chamber 10 is reduced. However, it is preferable to reduce the pressure in the chamber 10 after the decorative sheet piece 36 is heated in terms of working efficiency.

(4) Increasing the Pressure in the Chamber 10 from the Upper Chamber 102 Side As shown in FIG. 9, the chamber 10 is connected to the pressurized tank 24. Since the hot stamping apparatus 1 according to the present embodiment includes the partition sheet 18, a pressure state between an upper side and a lower side can be changed by the partition sheet 18.

In the present embodiment, first, a reduced pressure state on the upper chamber 102 side is released, so that the pressing body 38 strongly presses the decorative sheet piece 36. Thereafter, the upper chamber 102 side is brought into an increased pressure state by using the pressurized tank 24. By increasing the pressure, the pressing body 38 presses the decorative sheet piece 36 more strongly, and thus, the decorative sheet piece 36 more strongly adheres to the decoration object 32.

The decorative sheet piece 36 and the decoration object 32 are brought into tight contact with each other even without the step of increasing the pressure in this method, but the decorative sheet piece 36 and the decoration object 32 are strongly brought into tight contact with each other by adding the step of increasing the pressure.

In the present embodiment, the pressure in the upper chamber 102 is set to 0.1 MPa or more and 0.8 MPa or less. From the viewpoint of bringing the decorative sheet piece 36 into tight contact with the decoration object 32, the pressure is preferably 0.5 MPa or more and 0.8 MPa or less.

In the present embodiment, the pressure in the chamber 10 is reduced or increased until a desired pressure is reached. For example, in one embodiment, a pressure-reducing time is 1 minute, and a pressure-increasing time is 1 minute. Even when the time is longer, a degree of the tight contact does not change.

Figure 10:
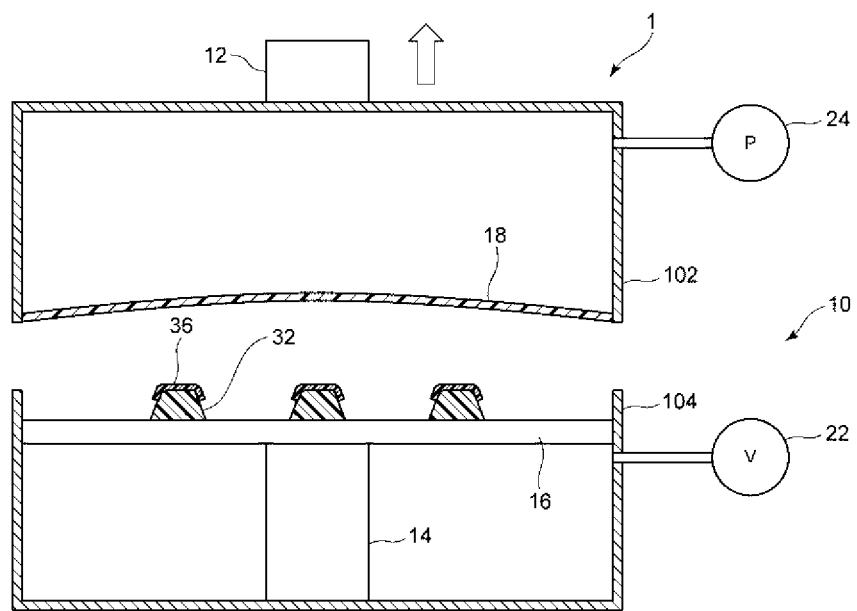
FIG. 10 is a diagram showing a take-out step.

(5) Releasing the Pressure-Increasing/Pressure-Decreasing State, Opening the Chamber 10, and taking out the Decoration Objects 32 After Processing FIG. 10 shows a state in which the pressure-increasing/pressure-decreasing state is released, a temperature inside of the chamber 10 is returned to a room temperature and the chamber 10 is opened. A white arrow in FIG. 10 indicates that the upper chamber 102 is raised. After the predetermined pressure-reducing time/pressure-increasing time elapses, the pressure-increasing/pressure-decreasing state is released, and the pressure of the decoration object peripheral space is returned to a normal pressure. In addition, by opening the chamber 10, the decoration objects 32 are cooled (left to cool).

Here, a step of removing an excess portion of the decorative sheet piece 36 may be added. For example, the excess portion can be removed by using a cutting die or laser cutting.

As described above, in the hot stamping apparatus 1 according to the present embodiment, the upper chamber 102 and the lower chamber 104 are partitioned by the partition sheet 18 and the pressing bodies 38, so that the decorative sheet pieces 36 can be used instead of the decorative sheet having a large area. By using the decorative sheet pieces 36, local thermal deformation can be prevented.

Further, by using the decorative sheet pieces 36, a usage amount of the decorative sheet can be reduced, and three-dimensional decoration can be implemented as needed on a portion requiring decoration. Further, since the decorative sheet pieces 36 can be used, scratch resistance required for the decoration objects 32 can be obtained.

The hot stamping apparatus and the hot stamping method according to the present embodiment are suitably used for decorating vehicle components. Specifically, the hot stamping apparatus and the hot stamping method are suitably used for decorating a spoiler, a side skirt, a bumper, a combination lamp, a headlamp, a fender, an instrument panel, a wheel, a top cowling, and a radiator grille. This is because these components have a complicated three-dimensional shape, and are clearly divided into a portion requiring decoration and a portion not requiring decoration. In a case of a small component such as a spoiler, a combination lamp, or a headlamp, when a large-sized decorative sheet is used, unnecessary portions of the decorative sheet increase, so that the hot stamping apparatus and the hot stamping method according to the present embodiment are particularly effectively used.

Second Embodiment

In a second embodiment, a plurality of independent decorative sheet pieces 36 are fixed to the decoration objects 32 each including a plurality of decoration portions to be decorated, so as to perform decoration.

Figure 11:
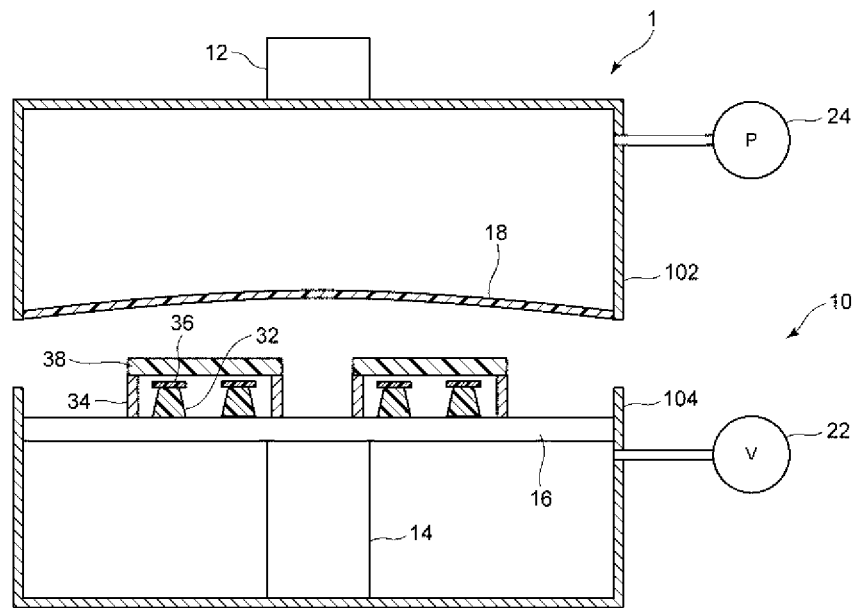
FIG. 11 is a diagram showing a state before a chamber is sealed.

FIG. 11 shows a state in which two sets are placed, the sets each including the frame body 34 and the pressing body 38. One decoration object 32 including two decoration portions is placed in one frame body 34. The independent decorative sheet pieces 36 are respectively fixed to the two decoration portions. Since the decorative sheet pieces 36 having different designs can be used for the two decoration portions, respectively, a degree of freedom in design is improved. Here, FIG. 11 shows a state before the chamber 10 is sealed. This state corresponds to FIG. 6 in the description of the first embodiment. Since the hot stamping method is the same as the method described above, the description thereof is omitted.

By using the plurality of independent decorative sheet pieces 36, decoration is performed on only a portion requiring decoration. As compared with a case of using a decorative sheet having a size that covers the entire surface of the placing table 16, the decorative sheet can be saved.

Third Embodiment

In a third embodiment, similarly to the second embodiment, a plurality of independent decorative sheet pieces 36 are fixed to the decoration object 32 including a plurality of decoration portions, so as to perform the decoration.

Figure 12:
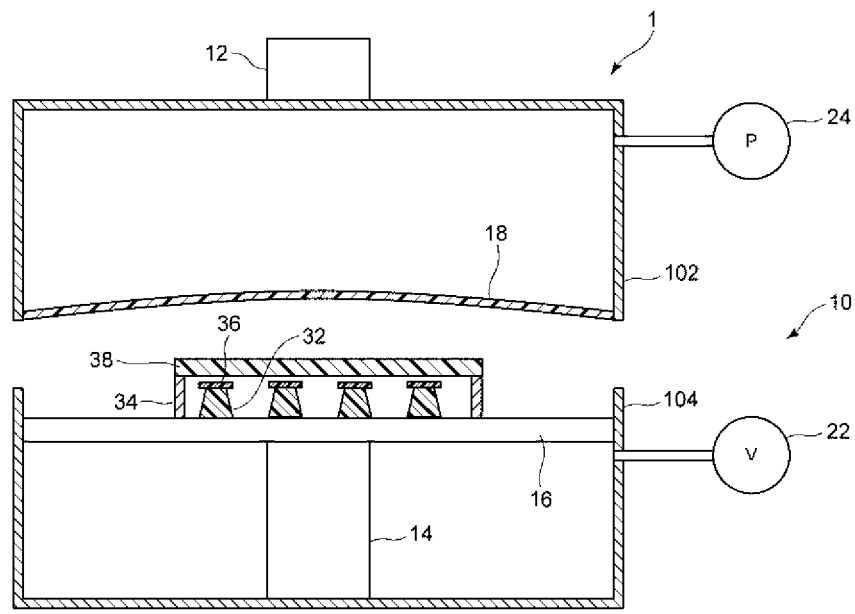
FIG. 12 is a diagram showing a state before a chamber is sealed.

FIG. 12 shows a state in which one decoration object 32 including a plurality of decoration portions is placed in one frame body 34. In the present embodiment, the decoration object 32 having four decoration portions in one frame body 34 is placed on the placing table 16. The independent and separate decorative sheet pieces 36 can be respectively fixed to the four decoration portions.

Here, FIG. 12 shows a state before the chamber 10 is sealed. This state corresponds to the state of FIG. 6 in the description of the first embodiment. Since the hot stamping method is the same as the method described above, the description thereof is omitted.

Examples of the decoration object 32 to which such a hot stamping method is suitable include a radiator grille of a vehicle.

In a case of a decoration object such as a radiator grill in which an area occupied by a base portion of the decoration object is large, but an area of the decoration portion is small, a portion that does not require decoration may also be decorated by spray coating. In addition, in view of a shape of the radiator grille in which the area of the decoration portion is smaller than that of the base portion, masking itself for preventing unnecessary coating is large in size. Further, in a case of a decoration object, such as a radiator grille, having a large working area and a decoration portion having a curved surface as a whole, when decoration is performed using a large-sized decorative sheet, there is a problem in that a difference in decoration between a center portion and a peripheral portion of the decoration object occurs even if the decoration is performed using a decorative sheet.

Therefore, in a case where a decoration object includes both a base portion and a plurality of covering portions protruding from the base portion, the hot stamping method according to the present embodiment using the decorative sheet piece 36 is a particularly effective decoration method. The hot stamping method according to the present embodiment is also suitably used for decoration of a fog lamp cover in view that the fog lamp cover includes both the base portion and the plurality of covering portions protruding from the base portion.

According to the hot stamping method of the present embodiment, since the decorative sheet piece 36 having a film thickness of 100 micrometers or more can be used, it is possible to impart the scratch resistance satisfying the above requirements to the radiator grille by one time processing.

Since the decorative sheet piece can be prepared in accordance with the shape of the decoration object, there is also an advantage that the difference in decoration between the center portion and the peripheral portion of the decoration object is less likely to occur.

Modification

The invention is not limited to the above-described embodiments, and various modifications can be added to the above-described embodiments without departing from the spirit of the invention.

Each of the drawings to which the following modifications refer shows a state before the chamber 10 is sealed. This state corresponds to the state of FIG. 6 in the description of the first embodiment.

First Modification

FIG. 13 shows a modification of the present embodiment. In the above-described embodiment, the pressing bodies 38 and the partition sheet 18 are separately prepared. However, as shown in FIG. 13, the pressing bodies 38 and the partition sheet 18 may be integrated. In this case, the pressing bodies 38 are embedded in predetermined positions of the partition sheet 18. In this case, there is an advantage that the pressing body 38 does not need to be disposed for each time when the decoration using the same frame body 34 is continuously performed.

Second Modification

As shown in FIG. 14, instead of preparing a plurality of pressing bodies 38, the pressing body 38 may be integrated with the partition sheet 18 to form one sheet. In this case, there is an advantage that the pressing body 38 does not need to be disposed for each time when the decoration is continuously performed. Further, there is another advantage that the displacement between the pressing body 38 and the frame body 34 is less likely to occur at the time of pressing.

Third Modification

Figure 15:
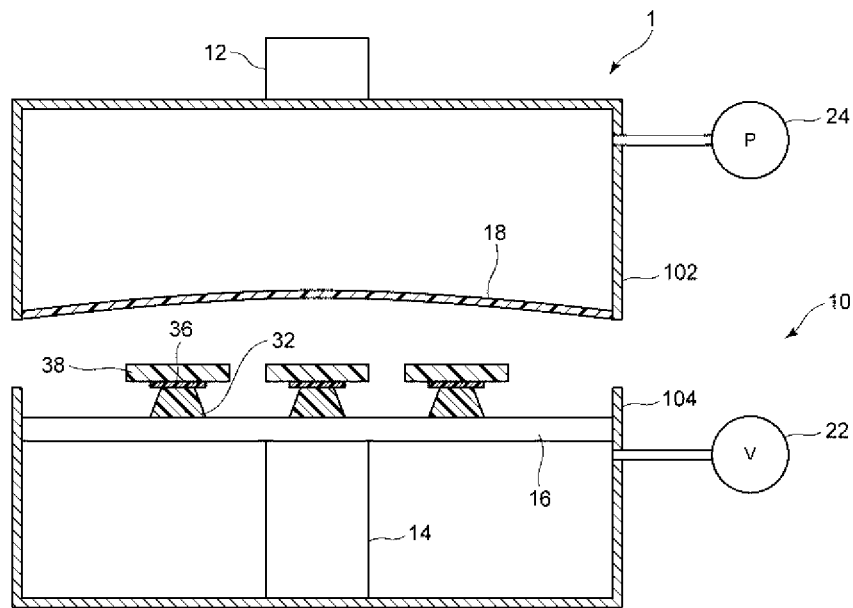
FIG. 15 is a diagram showing a state before a chamber is sealed.

As shown in FIG. 15, decoration can be performed without using the frame body 34. In this case, there is an advantage that the step of placing the frame body 34 can be omitted. Since a difference occurs in pressure applied to the pressing body 38 between the decoration object 32 placed on an edge portion of the placing table 16 and the decoration object 32 placed on a center portion of the placing table 16, the present modification is effectively used for decorating the decoration object 32 which is not greatly affected by such a difference. For example, the decoration is performed when the number of the decoration objects 32 is small.

Fourth Modification

Figure 16:
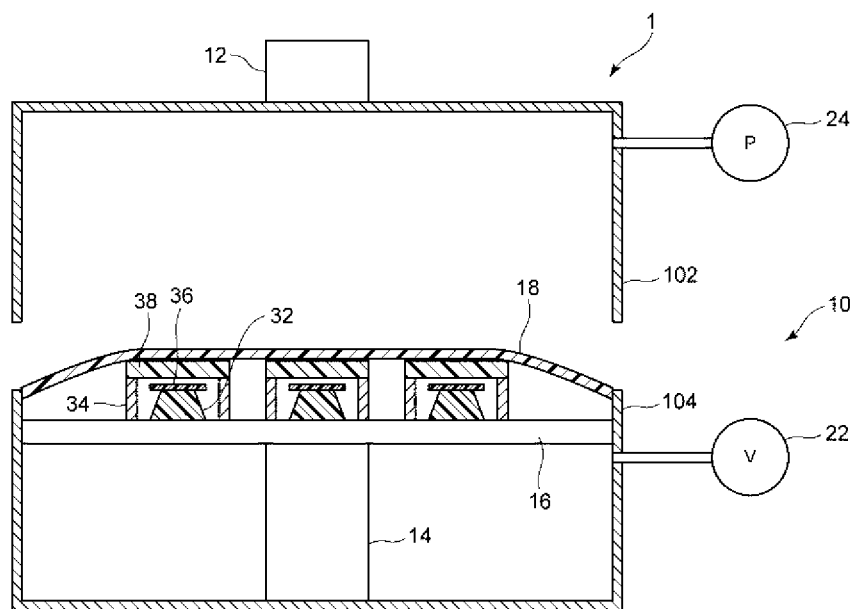
FIG. 16 is a diagram showing a state before a chamber is sealed.

As shown in FIG. 16, the partition sheet 18 may be fixed to the lower chamber 104 instead of being fixed to the upper chamber 102. In this case, there is an advantage that the pressing body 38 can be prevented from being displaced when the upper chamber 102 is lowered.

In the above-described embodiments, the decorative sheet piece 36 at least includes an adhesive layer, a decorative layer, and a protective layer, and may further include a functional material for improving the design and the scratch resistance. For example, a filler for improving the scratch resistance of the decorative sheet piece 36, metal fine particles for improving the design, or the like may be used.

In the present embodiment, the step of increasing the pressure is started after the step of reducing the pressure is completed, but it is not necessary to clearly separate these two steps, and these two steps may be appropriately adjusted according to characteristics of the decoration object. For example, when the step of reducing the pressure proceeds to some extent, the pressure-reducing performed on the upper chamber 102 side may be released to perform the pressure-increasing on the upper chamber 102 side while the pressure-reducing is performed on the lower chamber 104 side. By such adjustment, a time of performing the steps can be shortened.

What is claimed is:

1. A hot stamping apparatus comprising:
    a decoration object;
    a plurality of separate and independent decorative sheet pieces;
    a chamber which includes an upper chamber and a lower chamber;
    a placing table inside the lower chamber, wherein the decoration object is placed on the placing table with the plurality of separate and independent decorative sheet pieces fixed to the decoration object so as to be in direct contact with the decoration object but not in direct contact with the upper chamber or the lower chamber;
    a heater configured to heat the decorative sheet pieces;
    a partition sheet above the decorative sheet pieces, wherein the partition sheet is fixed to and covering an opening portion of either the upper chamber or the lower chamber;
    at least one pressing body that is elastic, is separate from the decorative sheet pieces, and configured to press the decorative sheet pieces against the decoration object; and
    a vacuum pump configured to reduce a pressure in the chamber, wherein the hot stamping apparatus is configured to apply pressure to the partition sheet and to cause the pressing body to be brought into contact with and press against the decorative sheet pieces, by increasing the pressure from the upper chamber, so that the decorative sheet pieces are brought into tight contact with the decoration object.

2. The hot stamping apparatus according to claim 1, further comprising:
a pressurized tank configured to increase a pressure in the chamber.

3. The hot stamping apparatus according to claim 1, wherein the pressing body is integrated with the partition sheet to form one sheet.

4. The hot stamping apparatus according to claim 1, further comprising at least one frame body on the placing table surrounding the plurality of separate and independent decorative sheet pieces.

5. The hot stamping apparatus according to claim 4, wherein the frame body is open in the vertical direction.

6. The hot stamping apparatus according to claim 5, wherein the frame body is higher in the vertical direction than the decoration object.

7. The hot stamping apparatus according to claim 6, wherein the frame body, the pressing body and the placing table together are configured to form a closed space around the decoration object.

8. The hot stamping apparatus according to claim 5, wherein the frame body, the pressing body and the placing table are together configured to form a closed space around the decoration object.

9. The hot stamping apparatus according to claim 4, wherein the frame body is higher in the vertical direction than the decoration object.

10. The hot stamping apparatus according to claim 4, wherein the frame body, the pressing body and the placing table together are configured to form a closed space around the decoration object.

11. The hot stamping apparatus according to claim 1, wherein the separate and independent decorative sheet pieces each include a decorative layer and a protective layer.

12. The hot stamping apparatus according to claim 1, further comprising at least one frame body on the placing table surrounding the plurality of separate and independent decorative sheet pieces, wherein the pressing body is supported by the frame.

* * * * *